(12) United States Patent
Stack et al.

(10) Patent No.: US 10,855,456 B2
(45) Date of Patent: *Dec. 1, 2020

(54) QUANTUM KEY DISTRIBUTION INFORMATION LEAKAGE DUE TO BACKFLASHES IN SINGLE PHOTON AVALANCHE PHOTODIODES

(71) Applicant: The MITRE Corporation, McLean, VA (US)

(72) Inventors: Daniel T. Stack, Thornton, CO (US); Stephen P. Pappas, Roxbury, CT (US); Brandon V. Rodenburg, Ewing Township, NJ (US); Colin P. Lualdi, Weston, MA (US)

(73) Assignee: The MITRE Corporation, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/849,234

(22) Filed: Apr. 15, 2020

(65) Prior Publication Data
US 2020/0244449 A1     Jul. 30, 2020

Related U.S. Application Data

(63) Continuation of application No. 15/702,085, filed on Sep. 12, 2017, now Pat. No. 10,666,433.

(51) Int. Cl.
*H04L 9/08* (2006.01)
*G01J 1/04* (2006.01)
*G01J 1/44* (2006.01)

(52) U.S. Cl.
CPC .......... *H04L 9/0852* (2013.01); *G01J 1/0429* (2013.01); *G01J 2001/442* (2013.01)

(58) Field of Classification Search
CPC ........ G01J 2001/442; G01J 2001/4466; H04L 9/0852; H04L 9/0855; H04L 9/0858; H04B 10/00
(Continued)

(56) References Cited

U.S. PATENT DOCUMENTS 8,213,616 B2   7/2012  Bloch et al.
9,294,271 B2   3/2016  Arahira
(Continued)

OTHER PUBLICATIONS

Colin P. Lualdi, Brandon V. Rodenburg, Daniel T. Stack, and Stephen P. Pappas, "QKD Information Leakage Due to Backflashes in Single Photon Avalanche Photodiodes," QCrypt 6th International Conference on Quantum Cryptography, Sep. 13, 2016, poster session, Washington, DC, 1 page.
Colin P. Lualdi, "Study of BB84 Information Leakage via APD Backflash," Princeton University Undergraduate Senior Thesis, May 1, 2017, Princeton University, 74 pages.
(Continued)

*Primary Examiner* — Robert Tavlykaev
(74) *Attorney, Agent, or Firm* — Sterne, Kessler, Goldstein & Fox P.L.L.C.

(57) ABSTRACT

A quantum cryptography apparatus and system includes a photon emitter, a photon receiver, a first photodetector, a second photodetector, a first polarization optic, and a second polarization optic. The photon emitter is configured to emit a photon at a wavelength. The photon receiver is coupled to the photon emitter by at least one quantum channel. The photon receiver includes the first polarization optic configured to output the emitted photon in a polarization state. The first photodetector is configured to detect the emitted photon from the output of the first polarization optic. The second photodetector is configured to detect a backflash from the first photodetector. The second polarization optic is between the first photodetector and the second photodetector. The second photodetector and the second polarization optic are configured to internally calibrate the photon receiver.

20 Claims, 6 Drawing Sheets

(58) Field of Classification Search
USPC .................................................. 385/100, 147
See application file for complete search history.

(56) References Cited

U.S. PATENT DOCUMENTS

| | | | |
|---|---|---|---|
| 9,634,835 | B2 | 4/2017 | Legré et al. |
| 2004/0131179 | A1* | 7/2004 | Ichimura ............... H04L 9/0852 380/28 |
| 2004/0208638 | A1* | 10/2004 | Jansen ............... H04B 10/2513 398/183 |
| 2012/0177201 | A1 | 7/2012 | Ayling et al. |
| 2014/0119537 | A1 | 5/2014 | Legre et al. |
| 2014/0205301 | A1 | 7/2014 | Frohlich et al. |
| 2015/0236791 | A1 | 8/2015 | Nordholt et al. |
| 2017/0222731 | A1 | 8/2017 | Lucamarini et al. |

OTHER PUBLICATIONS

Alice Meda et al., "Backflash light characterization to prevent QKD zero-error hacking," ArXiv:1605,05562v1, May 18, 2016, 6 pages.
Alice Meda et al., "Quantifying backflash radiation to prevent zero-error attacks in quantum key distribution," Light: Science & Applications, vol. 6, e16261, Jun. 16, 2017, 5 pages.
Christian Kurtsiefer et al., "The breakdown flash of Silicon Avalance Photodiodes—backdoor for eavesdropper attacks?," J. Mod. Opt. 48, 2039-47, Jan. 15, 2001, 9 pages.
Nitin Jain, "Security of practical quantum key distribution systems," Ph.D. Dissertation, Friedrich Alexander University, Feb. 24, 2015, 168 pages.
Gerhardt et al., "Full-field implementation of a perfect eavesdropper on a quantum cryptography system," Nature Communications, 2:349, 10:1038, 2011, 6 pages.

* cited by examiner

QUANTUM KEY DISTRIBUTION INFORMATION LEAKAGE DUE TO BACKFLASHES IN SINGLE PHOTON AVALANCHE PHOTODIODES

CROSS REFERENCE TO RELATED APPLICATION

This application is a continuation of U.S. application Ser. No. 15/702,085, filed Sep. 12, 2017, which is hereby incorporated herein in its entirety by reference.

BACKGROUND

Field

The present disclosure relates to quantum cryptography apparatuses and systems. More specifically, embodiments of the present disclosure relate to quantum cryptography apparatuses and systems to detect and characterize information leakage due to backflashes in single photon photodetectors.

Background

Quantum key distribution (QKD) promises a theoretically unbreakable cryptosystem by employing the probabilistic nature of quantum measurement over mutually unbiased bases. Nevertheless, QKD systems possess security vulnerabilities due to engineering, technical, and technological imperfections in practical implementations. For example, single photon photodetectors used in QKD systems could be a source of information leakage due to the emission of unaccounted photons or secondary emissions, deemed backflashes, that occur after the incident or main information-carrying photons impinge and are detected by a photodetector, in particular, an avalanche photodiode (APD).

SUMMARY

In some embodiments, a quantum cryptography apparatus includes a photon emitter configured to emit a photon at a wavelength, a photon receiver coupled to the photon emitter by at least one quantum channel and including a first polarization optic configured to output a polarization state of the emitted photon, a first photodetector configured to detect the emitted photon from the output of the first polarization optic, a second photodetector configured to detect a backflash from the first photodetector, and a second polarization optic between the first photodetector and the second photodetector. In some embodiments, the second polarization optic is configured to detect a polarization dependence of the backflash from the first photodetector.

In some embodiments, the photon receiver includes two arms, each arm associated with a BB84 basis. In some embodiments, the photon receiver includes a non-polarizing 50:50 beamsplitter that couples the two arms. In some embodiments, the photon receiver comprises two arms, each arm associated with a BB84 basis, and a non-polarizing 50:50 beamsplitter that couples the two arms.

In some embodiments, the at least one quantum channel is a free space channel. In some embodiments, the wavelength of the emitted photon is 400 nm to 1100 nm. In some embodiments, the at least one quantum channel is a free space channel and the wavelength of the emitted photon is 400 nm to 1100 nm.

In some embodiments, the at least one quantum channel is a fiber optic channel. In some embodiments, the wavelength of the emitted photon is 1100 nm to 1600 nm. In some embodiments, the at least one quantum channel is a fiber optic channel and the wavelength of the emitted photon is 1100 nm to 1600 nm.

In some embodiments, the second photodetector is a four channel single photon counting avalanche photodiode (APD) array. In some embodiments, the second photodetector is configured to simultaneously detect the polarization dependence of the backflash from the first photodetector. In some embodiments, the second photodetector is a four channel single photon counting avalanche photodiode (APD) array and configured to simultaneously detect the polarization dependence of the backflash from the first photodetector.

In some embodiments, the first photodetector is a four channel single photon counting avalanche photodiode (APD) array. In some embodiments, the first photodetector is configured to simultaneously detect the polarization state of the emitted photon from the photon emitter. In some embodiments, the first photodetector is a four channel single photon counting avalanche photodiode (APD) array and configured to simultaneously detect the polarization state of the emitted photon from the photon emitter.

In some embodiments, the second polarization optic comprises an adjustable linear polarizer. In some embodiments, the second polarization optic can include a plurality of second polarization optics. In some embodiments, the first polarization optic can include a plurality of first polarization optics. In some embodiments, the emitted photon from the photon emitter is circularly polarized. In some embodiments, the emitted photon from the photon emitter is linearly polarized. In some embodiments, the emitted photon from the photon emitter is elliptically polarized. In some embodiments, the emitted photon from the photon emitter is randomly polarized.

In some embodiments, the apparatus includes a calibration of the quantum key distribution system based on the polarization dependence of the backflash. In some embodiments, the apparatus includes a trigger for an alarm subsystem based on the polarization dependence of the backflash. In some embodiments, the apparatus includes a deterrent for subsequent measurement of the backflash based on the polarization dependence of the backflash.

In some embodiments, a quantum key distribution system for characterizing backflashes includes a photon emitter configured to emit a photon at a wavelength, a photon receiver coupled to the photon emitter by at least one quantum channel and including a first polarization optic configured to output a polarization state of the emitted photon, a first photodetector configured to detect the photon emitted from the output of the first polarization optic, a second photodetector configured to detect a backflash from the first photodetector, a second polarization optic between the first photodetector and the second photodetector. In some embodiments, the second polarization optic is configured to detect a polarization dependence of the backflash from the first photodetector.

In some embodiments, a data acquisition subsystem is coupled to the second photodetector. In some embodiments, the data acquisition subsystem characterizes the polarization dependence of the backflash. In some embodiments, the data acquisition subsystem includes an alarm subsystem based on the polarization dependence of the backflash. In some embodiments, the data acquisition subsystem is configured to decrypt a quantum key distribution between the photon emitter and the photon receiver.

In some embodiments, the system includes a calibration of the quantum key distribution system based on the polarization dependence of the backflash. In some embodiments, the system includes a trigger for an alarm subsystem based on the polarization dependence of the backflash. In some embodiments, the system includes a deterrent for subsequent measurement of the backflash based on the polarization dependence of the backflash.

In some embodiments, a method for characterizing backflashes in a quantum key distribution system includes emitting a photon from a photon emitter at a wavelength, transferring the emitted photon by at least one quantum channel to a photon receiver, receiving the emitted photon through a first polarization optic with a first photodetector, detecting a backflash from the first photodetector with a second photodetector, and characterizing a polarization dependence of the backflash through a second polarization optic.

In some embodiments, the method includes calibrating the quantum key distribution system based on the polarization dependence of the backflash. In some embodiments, the method includes triggering an alarm subsystem based on the polarization dependence of the backflash. In some embodiments, the method includes deterring subsequent measurement of the backflash based on the polarization dependence of the backflash.

In some embodiments, deterring subsequent measurement of the backflash includes implementing an optical isolator, an optical circulator, an optical modulator, and an optical filter, or some combination thereof.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
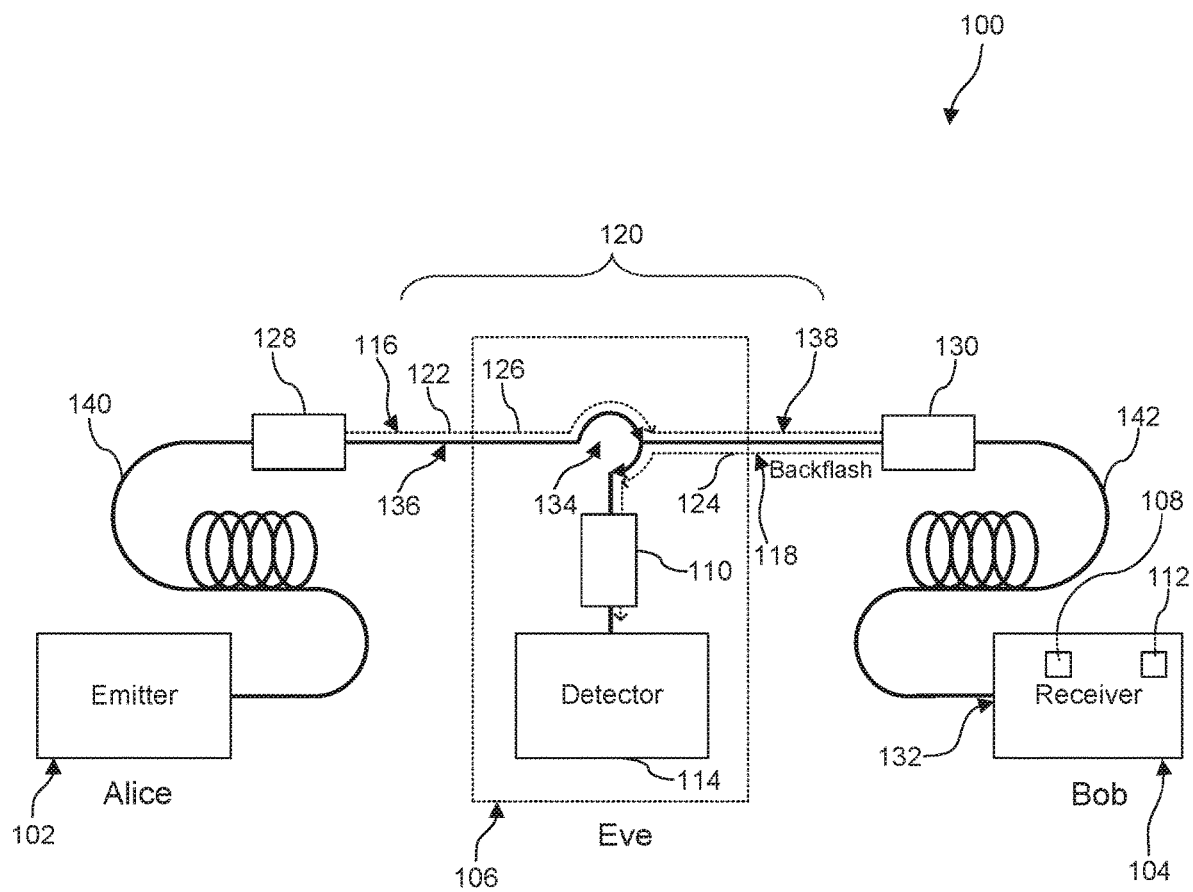
FIG. 1 illustrates a schematic diagram of a quantum cryptography apparatus, according to some embodiments.

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is within the knowledge of one skilled in the art to affect such feature, structure, or characteristic in connection with other embodiments whether or not explicitly described.

The following examples are illustrative, but not limiting, of the embodiments of this disclosure. Other suitable modifications and adaptations of the variety of conditions and parameters normally encountered in the field, and which would be apparent to those skilled in the relevant art(s), are within the spirit and scope of the disclosure.

Quantum key distribution (QKD) is a method for sharing of secret cryptographic keys between two parties with an unprecedented level of security. A sender (sometimes referred to herein as "Alice") encodes a secret key in the form of quantum states and transmits them to a receiver (sometimes referred to herein as "Bob"), who performs quantum measurements to obtain the key. Alice and Bob then use the shared secret key to send encrypted messages to each other. Ideal secrecy is achieved when the probability distribution of all possible unencrypted messages is equal to the probability distribution of all possible encrypted messages. This level of security is assured by the laws of quantum mechanics and does not depend on technological resources available to an eavesdropper (sometimes referred to herein as "Eve"), provided that the QKD implementation does not deviate from its theoretical model. However, the security of practical systems depends on their device implementations. Deviations of QKD devices from their theoretical model can be exploited by an eavesdropper though side-channel or back-door attacks.

Practical QKD implementations utilize protocols, for example, BB84, with photons as the quantum state carriers that can utilize existing long-distance fiber communication networks. Recently, free-space QKD systems have been explored for their potential global scale applications, eliminating fibers and utilizing optical communication from ground to low-orbital satellites. Such implementations typically use single photon avalanche photodiodes (SPADs) to measure quantum basis states. Systems that use a free-space quantum channel, generally 400 nm to 1100 nm wavelengths, typically employ silicon (Si) SPADs, whereas systems that use a fiber optic quantum channel, generally 1100 nm to 1600 nm wavelengths, in telecommunications networks use indium gallium arsenide (InGaAs) SPADs. Avalanches of charge carriers in both Si and InGaAs SPADs are known to be accompanied by photon back reflections or secondary emissions, known generally as backflashes, due to electron-hole recombination in the SPADs. Such backlash photons could carry information regarding the qubits sent by Alice to Bob. Since it is impossible to directly measure a quantum state without collapsing it, Eve cannot intercept states mid-transmission to acquire the keys without destroying the quantum state. However, Eve may be able to utilize backflashes to tap into the quantum channel shared between Alice and Bob and go undetected, since the quantum bit error rate (QBER) is independent of backflash photons.

Backflashes are secondary photons or secondary emissions caused by electron-hole recombination and carrier relaxation (e.g., direct, phonon-assisted, or Bremsstrahlung) in a photodiode that occur when photons impinge a semiconductor material. Avalanche photodiodes (APDs) utilize a semiconductor p-n junction and when the reverse bias voltage of the p-n junction is raised to a breakdown voltage, absorption by a single photon generates carriers in the conduction band which triggers an avalanche process. The avalanche process generates a measureable current which can be used to register the detection time of a single photon. Backflashes may be either absorbed in a quiescent region of the semiconductor, triggering new avalanches, or may be coupled back into the quantum channel and tapped by Eve who can potentially deduce the states of the original information-carrying photons. Since the creation of backflashes is a random process, Alice and Bob have no knowledge of or control over backflashes that escape Bob's receiver. As backflashes exit Bob's receiver, for example, a BB84 receiver, they acquire distinct polarization states by transmitting through optical elements in Bob's receiver. Thus, a backflash can obtain a unique polarization state based on the polarization optics and scheme in the photon receiver.

FIG. 1 illustrates quantum cryptography apparatus 100, according to an embodiment. Quantum cryptography apparatus 100 can include photon emitter 102, photon receiver 104, and quantum channel 120. Alice creates randomly polarized photons with photon emitter 102 and sends emitted photon 116 with polarization state 122 along quantum channel 120 to Bob who receives and measures emitted photon 116 with polarization state 122 with photon receiver 104. In some embodiments, quantum channel 120 can be free-space channel 136 and emitted photon 116 can have a wavelength of wavelength of 400 nm to 1100 nm. As shown in FIG. 1, for example, quantum channel 120 can include first collimator 128 and second collimator 130. In some embodiments, quantum channel 120 can be fiber optic channel 138 and emitted photon 116 can have a wavelength of 1100 nm to 1600 nm. As shown in FIG. 1, for example, photon emitter 102 can include emitter fiber optic port 140 and photon receiver 104 can include receiver fiber optic port 141 in some embodiments, as shown in FIG. 1, quantum channel 120 can be free-space channel 136, photon emitter 102 can include emitter fiber optic port 140 coupled to first collimator 128, and photon receiver 104 can include receiver fiber optic port 142 coupled to second collimator 130. In some embodiments, emitted photon 116 with polarization state 122 can be circularly polarized 126.

Figure 2:
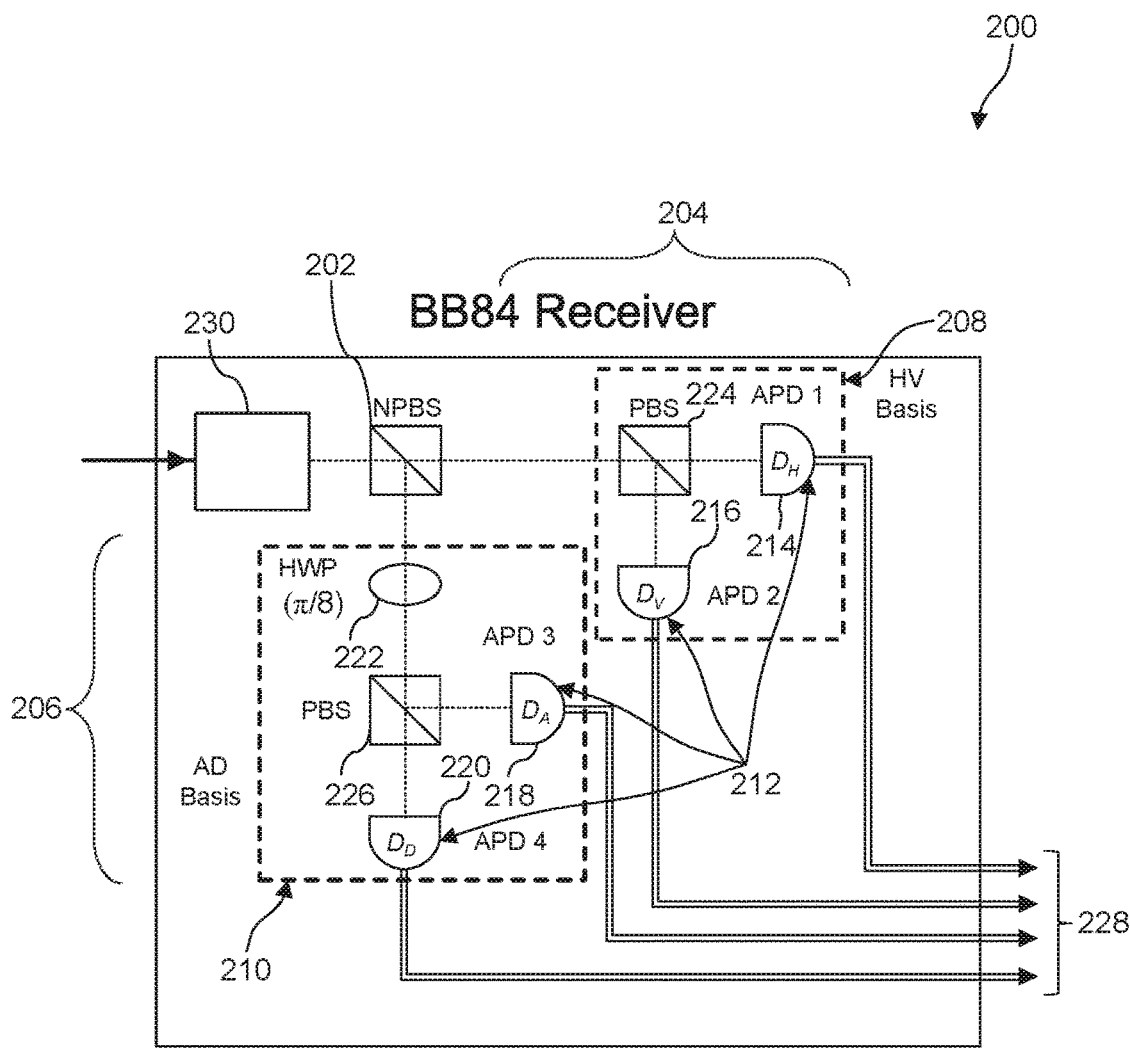
FIG. 2 illustrates a schematic diagram of a photon receiver, according to some embodiments.

Photon receiver 104 may include first polarization optic 108, first photodetector 112, and receiver input port 132. Emitted photon 116 with polarization state 122 transmits through receiver input port 132 and first polarization optic 108. First polarization optic 108 is configured to output polarization state 122 of emitted photon 116. For example, as shown in FIG. 2, first polarization optic 108 can be non-polarizing 50:50 beamsplitter 202. In some embodiments, first polarization optic 108 can be a plurality of first polarization optics including, for example, non-polarizing 50:50 beamsplitter 202, half-wave plate ($\pi/8$) 222, first polarizing beamsplitter 224, and/or second polarizing beamsplitter 226, or any combination thereof. First photodetector 112 is configured to detect emitted photon 116 from the output of first polarization optic 108. In some embodiments, first photodetector 112 is four channel single photon APD array 212. For example, as shown in FIG. 2, four channel single photon APD array 212 may be configured to simultaneously detect polarization state 122 of emitted photon 116 from photon emitter 102. As shown in FIG. 1, first photodetector 112 may generate backflash 118, which can be detected by Bob (internally) or Eve (externally), traveling back out of first polarization optic 108, receiver input port 132, receiver fiber optic port 142, second collimator 130, and second photodetector 114 in a direction anti-parallel to fiber optic channel 138. In some embodiments, photon receiver 104 can be BB84 receiver 200.

In some embodiments, quantum cryptography apparatus 100 can further include Eve with eavesdropping receiver 106. Eavesdropping receiver 106 can include second polarization optic 110, second photodetector 114, and optical circulator 134. As shown in FIG. 1, for example, Eve can utilize optical circulator 134 to tap into quantum channel 120 and siphon off backflash 118 without detection by Alice or Bob, and without disturbing polarization state 122 of emitted photon 116. Eve can then detect backflash 118 with second photodetector 114 and detect polarization dependence 124 of backflash 118 by using second polarization optic 110 to deduce the original polarization state 122 of emitted photon 116. In some embodiments, eavesdropping receiver 106 may be configured to detect backflash 118 from first photodetector 112 with second polarization optic 110. Second polarization optic 110 may be configured to output polarization dependence 124 of backflash 118. In some embodiments, second polarization optic 110 can be a plurality of first polarization optics 108 including, for example, non-polarizing 50:50 beamsplitter 202, half-wave plate ($\pi/8$) 222, first polarizing beamsplitter 224, second polarizing beamsplitter 226, and/or optical circulator 134, or any combination thereof. Second photodetector 114 may be configured to detect backflash 118 from the output of second polarization optic 110. In some embodiments, second photodetector 114 is four channel single photon APD array 212. In some embodiments, optical circulator 134 can be an optical isolator, an optical modulator, and/or an optical filter, or some combination thereof. Similar to photon receiver 104, in some embodiments, eavesdropping receiver 106 can mimic the same or similar optical arrangement and scheme as photon receiver 104, for example, BB84 receiver 200.

As will be appreciated by persons skilled in the relevant art(s), BB84 is a QKD scheme developed by Bennett and Brassard in 1984, and was the first quantum cryptography protocol. In some embodiments, BB84 can be implemented using photon polarization, photon phase, or photon frequency encoding. When modeled as a two-state quantum system, photon polarization includes two quantum states that form a complete orthogonal basis spanning the two-dimensional Hilbert space. A common pair of basis states is horizontal $|H\rangle=|0\rangle$ and vertical $|V\rangle=|1\rangle$, which are orthogonal to each other and form polarization basis HV. Through superposition, two additional orthogonal states can be created and deemed antidiagonal $|A\rangle=|-\rangle$ and diagonal $|D\rangle=|+\rangle$, which are orthogonal to each other and form polarization basis AD, but are non-orthogonal to polarization basis HV. Thus, together bases HV and AD give the following four qubit states:

$$|H\rangle = |\psi_{00}\rangle = |0\rangle,$$

$$|V\rangle = |\psi_{10}\rangle = |1\rangle,$$

$$|A\rangle = |\psi_{01}\rangle = \frac{1}{\sqrt{2}}(|H\rangle - |V\rangle) = \frac{1}{\sqrt{2}}(|0\rangle - |1\rangle) \equiv |-\rangle,$$

$$|D\rangle = |\psi_{11}\rangle = \frac{1}{\sqrt{2}}(|H\rangle + |V\rangle) = \frac{1}{\sqrt{2}}(|0\rangle + |1\rangle) \equiv |+\rangle,$$

Upon measurement, $|H\rangle$ and $|A\rangle$ correspond to bit 0, and $|V\rangle$ and $|D\rangle$ correspond to bit 1. In order to send randomly polarized photons, Alice randomly chooses a polarization basis, either HV or AD, and records this basis information. Alice then creates a photon with a random polarization in that selected basis, and records the polarization state of the emitted photon and the associated bit value before sending to Bob over the quantum channel. Thus, each photon Alice creates has a random polarization state with a 25% probability of being either $|H\rangle$, $|V\rangle$, $|A\rangle$, or $|D\rangle$. Likewise, Bob randomly chooses a polarization basis, either HV or AD, records this basis information, and measures the random polarization state in the form of a corresponding bit, either 0 or 1, for each received photon.

In some embodiments, Alice creates a photon with random polarization by using four photon sources, for example, diode lasers, each associated with one of the four polarization states 122 used in the BB84 protocol. In some embodiments, Alice creates a photon with random polarization by using a single photon source and polarization optics, similar to first polarization optic 108, to create four polarization paths, each associated with one of the four polarization states 122 used in the BB84 protocol. In some embodiments, the polarized emitted photon 116 is then transmitted to Bob along a fiber optic channel 138. In some embodiments, the polarized emitted photon 116 is then transmitted to Bob along free-space channel 136.

FIG. 2 illustrates BB84 receiver 200, according to an embodiment. BB84 receiver 200 is one example type of photon receiver 104 that can be utilized in quantum cryptography apparatus 100. BB84 receiver 200 can include first polarization optic 108 and first photodetector 112. As shown in FIG. 2, for example, first polarization optic 108 can include non-polarizing 50:50 beamsplitter 202, first arm 204, and second arm 206. In some embodiments, first arm 204 corresponds to HV basis 208, and second arm 206 corresponds to AD basis 210. Non-polarizing 50:50 beamsplitter 202 connects first arm 204 and second arm 206, and performs the step of randomly choosing the basis for Bob by transmitting emitted photon 116 into first arm 204 (HV basis 208) or second arm 206 (AD basis 210) with equal probability. As shown in FIG. 2, for example, first photodetector 112 can be four-channel APD array 212, which includes first APD 214, second APD 216, third APD 218, and fourth APD 220. HV basis 208 can include first polarizing beamsplitter 224, first APD 214, and second APD 216. AD basis 210 can include half-wave plate ($\pi/8$) 222, second polarizing beamsplitter 226, third APD 218, and fourth APD 220.

First and second polarizing beamsplitters 224, 226 split emitted photon 116 according to whether emitted photon 116 is p-polarized (parallel to beamsplitter) or s-polarized (orthogonal to beamsplitter). If emitted photon 116 transmits through non-polarizing 50:50 beamsplitter 202, it enters first arm 204 and is detected by either first APD 214 or second APD 216 in HV basis 208. For example, emitted photon 116 that has polarization state 122 of |H⟩ transmits through first polarizing beamsplitter 224 and impinges first APD 214 and registers as bit 0 in first photodetector output 228. Similarly, in HV basis 208, emitted photon 116 that has polarization state 122 of |V⟩ is split and reflected by first polarizing beamsplitter 224 and impinges second APD 216 and registers as bit 1 in first photodetector output 228.

Alternatively, if emitted photon 116 is reflected by non-polarizing 50:50 beamsplitter 202, it enters second arm 206 and is detected by either third APD 218 or fourth APD 220 in AD basis 210. As emitted photon 116 enters second arm 206, it transmits through half-wave plate ($\pi/8$) 222, which when rotated $\pi/8$ (i.e., 22.5°) with respect to the horizontal, has the effect of rotating the linear polarization of emitted photon 116 by $\pi/4$ (i.e., 45°). For example, after being rotated by half-wave plate ($\pi/8$) 222, emitted photon 116 that has polarization state 122 of |D⟩ transmits through second polarizing beamsplitter 226 and impinges fourth APD 220 and registers as bit 1 in first photodetector output 228. Similarly, in AD basis 210, after being rotated by half-wave plate ($\pi/8$) 222, emitted photon 116 that has polarization state 122 of |A⟩ is split and reflected by first polarizing beamsplitter 224 and impinges third APD 218 and registers as bit 0 in first photodetector output 228.

Due to the design of BB84 receiver 200, any backflash 118 created by four-channel APD array 212 acquires specific polarization information as backflash 118 transmits back through first polarization optic 108 and exits receiver input port 132. There is no direct coherence, classical or quantum, between emitted photon 116 from Alice and backflash 118 from Bob, since emitted photon 116 is destroyed (e.g., absorbed, annihilated, recombined, etc.) in the measurement process with first photodetector 112, and backflash 118 created is an ordinary unpolarized photon. For example, when backflash 118 generates in and exits first APD 214, only backflash 118 with polarization state 122 of |H⟩ transmits back through first polarizing beamsplitter 224, and any other backflash 118 with a different polarization state 122 is reflected and lost. When backflash 118 with polarization state 122 of |H⟩ from first APD 214 reaches non-polarizing 50:50 beamsplitter 202, backflash 118 is either transmitted and exits receiver input port 132 or is reflected and lost with equal probability. A similar procedure occurs for backflash 118 when generated by the other respective APDs 216, 218, 220. Since each of Bob's APDs 214, 216, 218, 220 will produce backflash 118 with one of four unique polarization states 122, Eve is able to accurately reconstruct the results of Bob's measurements.

In some embodiments, quantum channel 120 is fiber optic channel 138. Polarization state 122 of emitted photon 116 can be transformed as emitted photon 116 travels along fiber optic channel 138. In some embodiments, third polarization optic 230 is utilized, for example, a set of waveplates, to transform polarization state 122 of emitted photon 116 back to the original state sent by Alice. In some embodiments, BB84 receiver 200 can include receiver fiber optic port 142.

Figure 3:
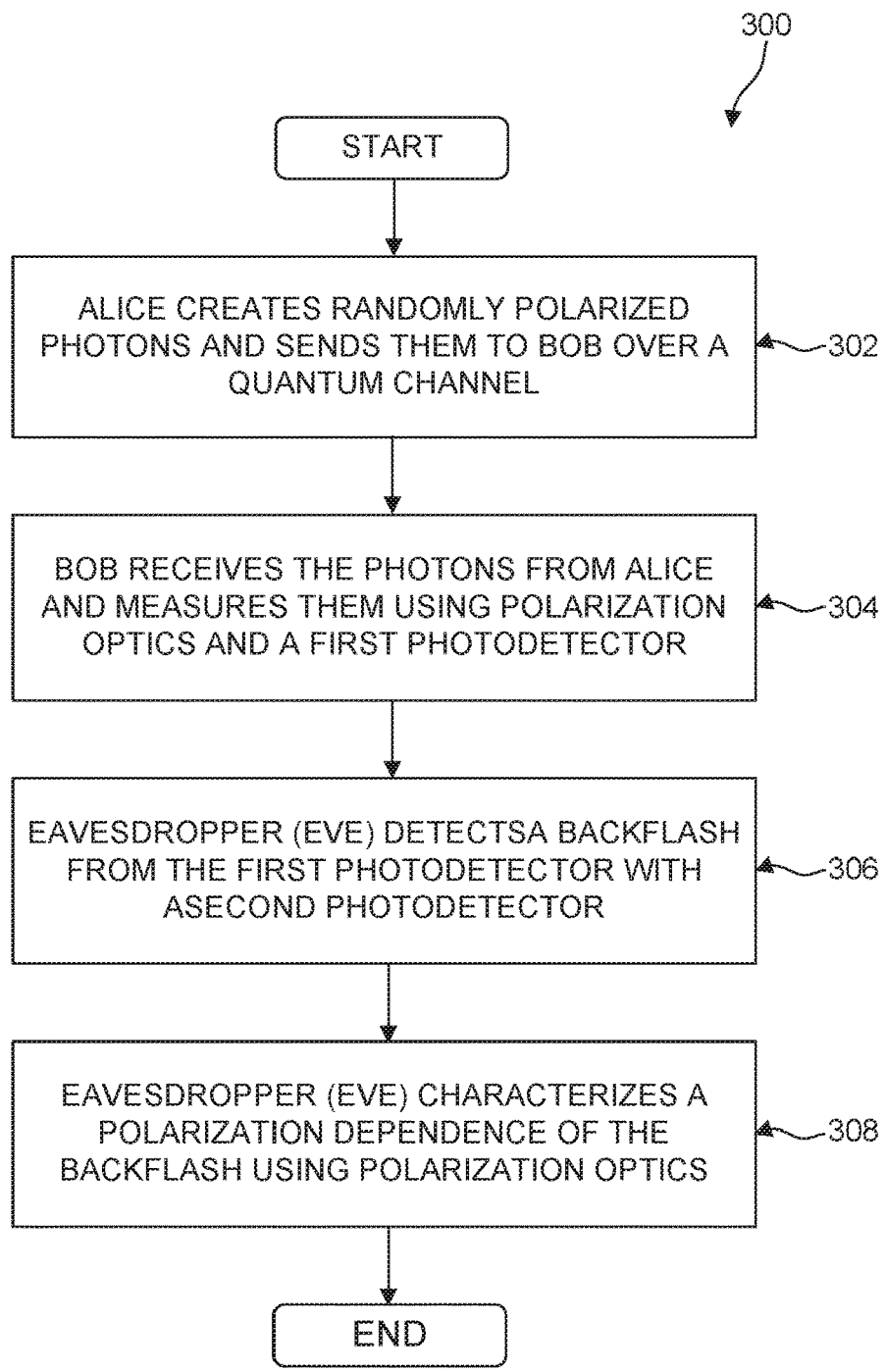
FIG. 3 illustrates a flow diagram for characterizing a backflash, according to some embodiments.

FIG. 3 illustrates flow diagram 300 for characterizing backflash 118, according to an embodiment. It is to be appreciated that not all steps in FIG. 3 may be needed to perform the disclosure provided herein. Further, some of the steps may be performed simultaneously, or in a different order than shown in FIG. 3. Flow diagram 300 shall be described with reference to FIGS. 1 and 2. However, flow diagram 300 is not limited to those example embodiments.

In 302, as shown in the example of FIG. 1, Alice creates randomly polarized emitted photon 116 and sends emitted photon 116 to Bob over quantum channel 120. Alice creates randomly polarized photons with photon emitter 102 and sends emitted photon 116 with polarization state 122 along quantum channel 120 to Bob. In some embodiments, quantum channel 120 can be free-space channel 136 and emitted photon 116 can have a wavelength of wavelength of 400 nm to 1100 nm. In some embodiments, quantum channel 120 can be fiber optic channel 138 and emitted photon 116 can have a wavelength of 1100 nm to 1600 nm. As shown in FIG. 1, for example, photon emitter 102 can include emitter fiber optic port 140. In some embodiments, as shown in FIG. 1, quantum channel 120 can be free-space channel 136 and photon emitter 102 can include emitter fiber optic port 140 coupled to first collimator 128. In some embodiments, emitted photon 116 with polarization state 122 can be circularly polarized 126.

Figure 6:
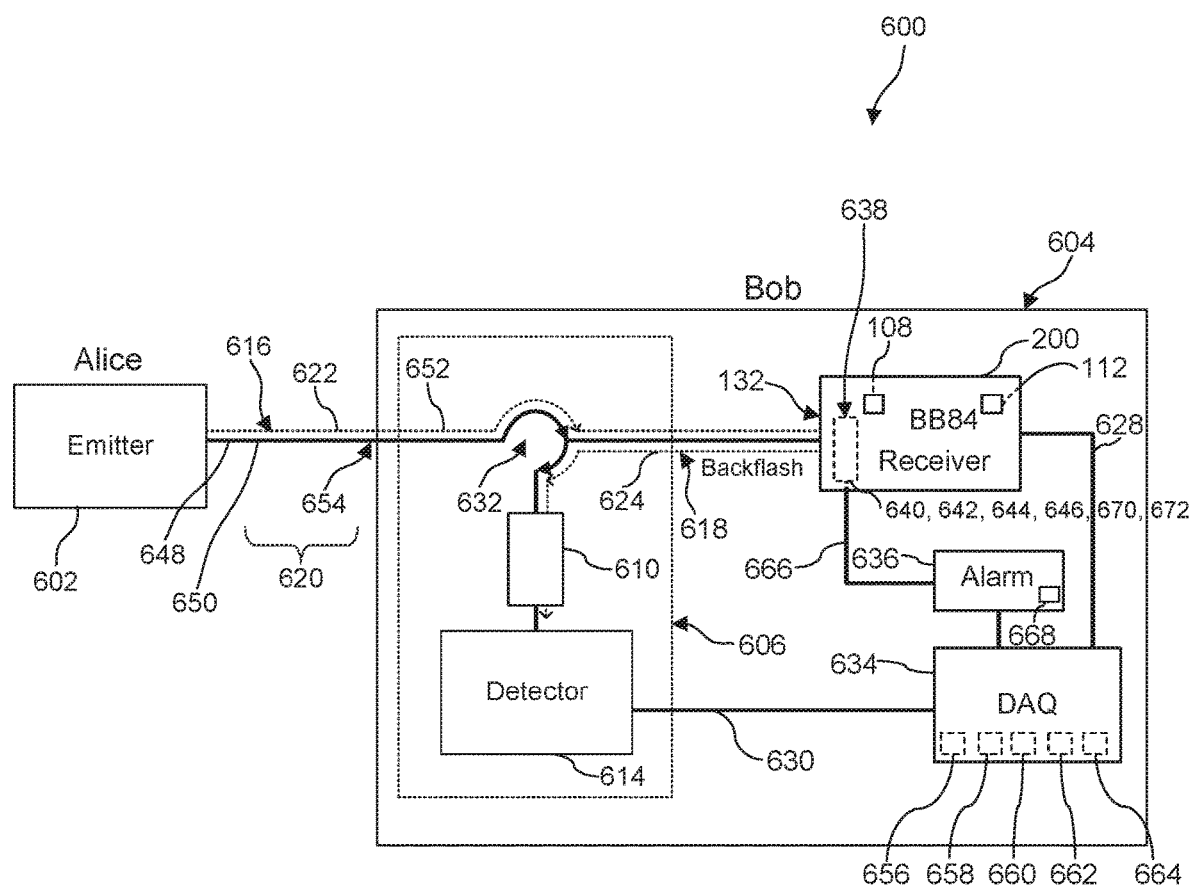
FIG. 6 illustrates a schematic diagram of a QKD system, according to some embodiments.

Alternatively, as shown in the example of FIG. 6, Alice can create randomly polarized emitted photon 616 and send emitted photon 616 to Bob over quantum channel 620. Alice creates randomly polarized photons with photon emitter 602 and sends emitted photon 616 with polarization state 622 along quantum channel 620 to Bob. In some embodiments, quantum channel 620 can be free-space channel 648 and emitted photon 616 can have a wavelength of wavelength of 400 nm to 1100 nm. In some embodiments, quantum channel 620 can be fiber optic channel 650 and emitted photon 616 can have a wavelength of 1100 nm to 1600 nm. In some embodiments, emitted photon 616 with polarization state 622 can be circularly polarized 652.

In 304, as shown in the example of FIG. 1, Bob receives emitted photon 116 from Alice and measures polarization state 122 of emitted photon 116 with photon receiver 104, which can include first polarization optic 108 and first photodetector 112. Emitted photon 116 with polarization state 122 transmits through receiver input port 132 and first polarization optic 108. First polarization optic 108 is configured to output polarization state 122 of emitted photon 116. For example, as shown in FIG. 2, first polarization optic 108 can be non-polarizing 50:50 beamsplitter 202. In some embodiments, first polarization optic 108 can be a plurality of first polarization optics including, for example, non-polarizing 50:50 beamsplitter 202, half-wave plate (π/8) 222, first polarizing beamsplitter 224, and/or second polarizing beamsplitter 226, or any combination thereof. First photodetector 112 is configured to detect emitted photon 116 from the output of first polarization optic 108. In some embodiments, first photodetector 112 is four channel single photon APD array 212. For example, as shown in FIG. 2, four channel single photon APD array 212 may be configured to simultaneously detect polarization state 122 of emitted photon 116 from photon emitter 102. As shown in FIG. 1, first photodetector 112 may generate backflash 118, which can be detected by Bob (internally) or Eve (externally), traveling back out of first polarization optic 108, receiver input port 132, receiver fiber optic port 142, and second collimator 130 in a direction anti-parallel to emitted photon 116. In some embodiments, photon receiver 104 can be BB84 receiver 200. In some embodiments, eavesdropping receiver 106 can be BB84 receiver 200. In some embodiments, as shown in FIG. 1, for example, photon receiver 104 can include receiver fiber optic port 142. In some embodiments, eavesdropping receiver 106 can include receiver fiber optic port 142. In some embodiments, as shown in FIG. 1, quantum channel 120 can be free-space channel 136 and photon receiver 104 can include receiver fiber optic port 142 coupled to second collimator 130.

Alternatively, as shown in the example of FIG. 6, Bob receives and measures emitted photon 616 with polarization state 622 with photon receiver 604. Photon receiver 604 may include BB84 receiver 200, backflash receiver 606, data acquisition (DAQ) subsystem 634, and first input port 654. In some embodiments, BB84 receiver 200 may include first polarization optic 108, first photodetector 112, and receiver input port 132. Emitted photon 616 with polarization state 622 transmits through receiver input port 132 and first polarization optic 108. First polarization optic 108 is configured to output polarization state 622 of emitted photon 616. For example, first polarization optic 108 can be non-polarizing 50:50 beamsplitter 202. In some embodiments, first polarization optic 108 can be a plurality of first polarization optics including, for example, non-polarizing 50:50 beamsplitter 202, half-wave plate (π/8) 222, first polarizing beamsplitter 224, and/or second polarizing beamsplitter 226, or any combination thereof. First photodetector 112 is configured to detect emitted photon 616 from the output of first polarization optic 108. In some embodiments, first photodetector 112 is four channel single photon APD array 212. For example, four channel single photon APD array 212 is configured to simultaneously detect polarization state 622 of emitted photon 616 from photon emitter 602. As shown in FIG. 6, BB84 receiver 200 generates backflash 618 traveling back out of BB84 receiver 200 in a direction anti-parallel to emitted photon 616.

In 306, as shown in the example of FIG. 1, Eve detects backflash 118 from first photodetector 112 with eavesdropping receiver 106, which can include second polarization optic 110 and second photodetector 114. Eavesdropping receiver 106 can include second polarization optic 110, second photodetector 114, and optical circulator 134. As shown in FIG. 1, for example, Eve can utilize optical circulator 134 to tap into quantum channel 120 and siphon off backflash 118 without detection by Alice or Bob, and without disturbing polarization state 122 of emitted photon 116.

Alternatively, as shown in the example of FIG. 6, Bob detects backflash 618 from first photodetector 112 with backflash receiver 606. Backflash receiver 606 can include second polarization optic 610, second photodetector 614, and backflash optical circulator 632. As shown in FIG. 6, for example, Bob can utilize backflash optical circulator 632 to siphon off and investigate backflash 618 without disturbing polarization state 622 of emitted photon 616 for internal calibration of photon receiver 604. Bob can use information from such investigation to monitor the health and operation status of photon receiver 104. Bob can also use such an arrangement to intercept backflash 618 to prevent third-party detection. Bob detects backflash 618 with second photodetector 614. In some embodiments, backflash receiver 606 is configured to detect backflash 618 from BB84 receiver 200 with second polarization optic 610. Second polarization optic 610 is configured to output polarization dependence 624 of backflash 618. In some embodiments, second polarization optic 610 can be a plurality of first polarization optics 108 including, for example, non-polarizing 50:50 beamsplitter 202, half-wave plate (π/8) 222, first polarizing beamsplitter 224, second polarizing beamsplitter 226, and/or optical circulator 134, or any combination thereof. Second photodetector 614 is configured to detect backflash 618 from the output of second polarization optic 610. In some embodiments, second photodetector 614 can be four channel single photon APD array 212. In some embodiments, backflash optical circulator 632 can be an optical isolator, an optical modulator, an optical filter, or some combination thereof. Similar to BB84 receiver 200, in some embodiments, backflash receiver 606 can mimic the same optical arrangement and scheme as BB84 receiver 200.

In 308, as shown in the example of FIG. 1, Eve characterizes polarization dependence 124 of backflash 118 by utilizing second polarization optic 110. Eve can characterize polarization dependence 124 of backflash 118 by using second polarization optic 110 to deduce the original polarization state 122 of emitted photon 116. In some embodiments, eavesdropping receiver 106 may be configured to detect backflash 118 from first photodetector 112 with second polarization optic 110. Second polarization optic 110 may be configured to output polarization dependence 124 of backflash 118. In some embodiments, second polarization optic 110 can be a plurality of first polarization optics 108 including, for example, non-polarizing 50:50 beamsplitter 202, half-wave plate (π/8) 222, first polarizing beamsplitter 224, second polarizing beamsplitter 226, and/or optical circulator 134, or any combination thereof. Second photodetector 114 may be configured to detect backflash 118 from the output of second polarization optic 110. In some embodiments, second photodetector 114 is four channel single photon APD array 212. In some embodiments, optical circulator 134 can be an optical isolator, an optical modulator, and/or an optical filter, or some combination thereof. Similar to photon receiver 104, in some embodiments, eavesdropping receiver 106 can mimic the same or similar optical arrangement and scheme as photon receiver 104, for example, BB84 receiver 200.

Alternatively, as shown in the example of FIG. 6, Bob characterizes polarization dependence 624 of backflash 618 by utilizing second polarization optic 610. Bob can characterize polarization dependence 624 of backflash 618 by using second polarization optic 610 to deduce the original polarization state 622 of emitted photon 616. In some embodiments, as shown in FIG. 6, DAQ subsystem 634 may be coupled to BB84 receiver 200 and backflash receiver 606, and may characterize polarization dependence 624 of backflash 618. DAQ subsystem 634 measures first photodetector output 628 from first photodetector 112 of BB84 receiver 200 and second photodetector output 630 from second photodetector 614 of backflash receiver 606. DAQ subsystem 634 detects and measures signals received by BB84 receiver 200 and backflash receiver 606. For example, DAQ subsystem 634 can detect and measure emitted photon 616 received by BB84 receiver 200, and determine polarization state 622 and basis (either HV basis 208 or AD basis 210) of emitted photon 616 by measuring which APD 214, 216, 218, 220 detects a signal or time stamp of emitted photon 616 during a finite time window. Similarly, for example, DAQ subsystem 634 can detect and measure backflash 618 generated by BB84 receiver 200 and collected by second photodetector 614, and characterize polarization dependence 624 of backflash 618 by configuring second polarization optic 610.

Figure 4:
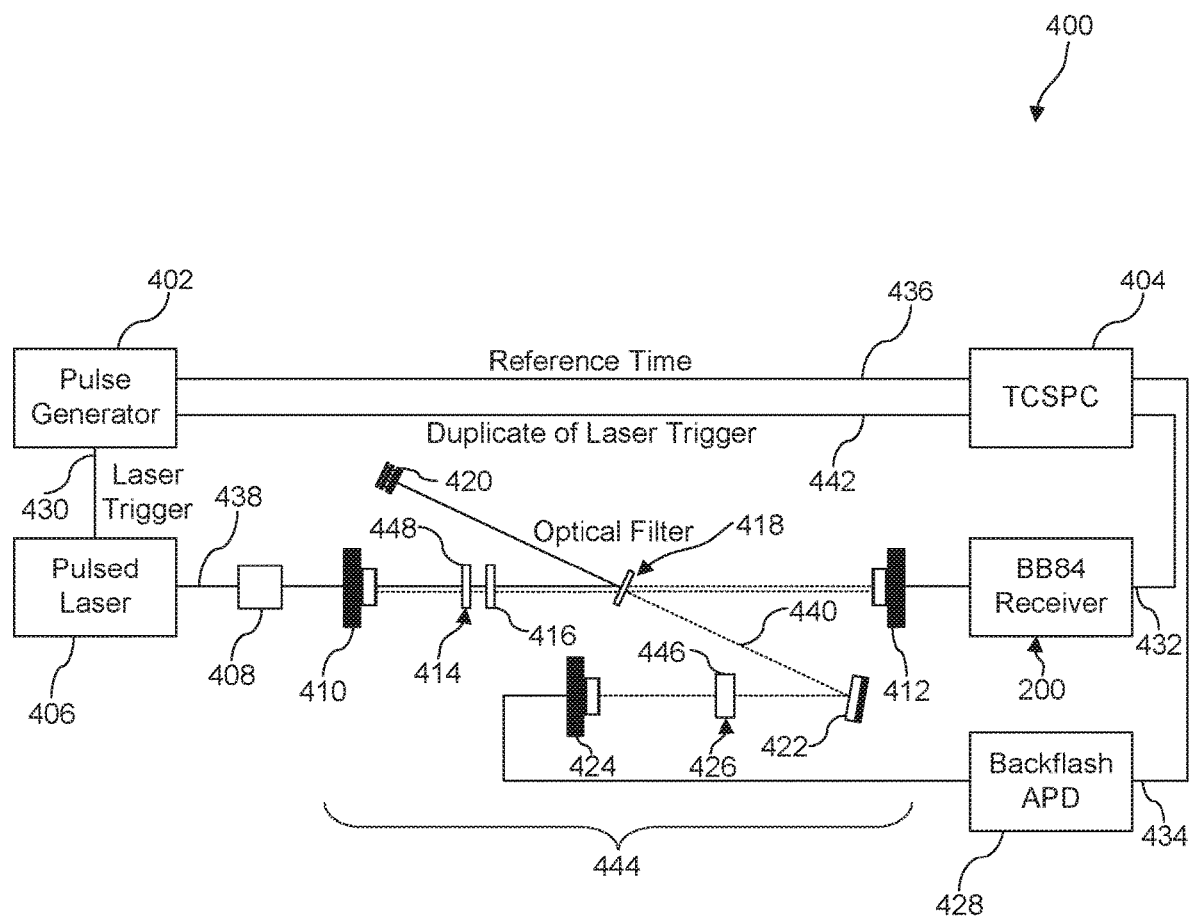
FIG. 4 illustrates a schematic diagram of a system for characterizing backflashes, according to some embodiments.

FIG. 4 illustrates backflash calibration setup 400 for characterizing backflash 440, according to an embodiment. Backflash calibration setup 400 can include BB84 receiver 200, pulse generator 402, pulsed laser 406, time-correlated single photon counting (TCSPC) system 404, optical filter 418, second polarizer 426, backflash APD 428, and free-space channel 444. Pulse generator 402 serves as timekeeper for backflash calibration setup 400 by setting time reference signal 436 and operating other components of backflash calibration setup 400 on offsets set by pulse generator 402. Pulse generator 402 provides precise delays for triggering (e.g., initiating), syncing, delaying, and gating events, and can initiate a sequence of events and/or be triggered by an event. For example, offsets, such as time delay offsets, are created by pulse generator 402 and detected by pulsed laser 406 and/or TCSPC system 404. Detection of such offsets indicates when various events initiate, for example, triggering an emitted laser pulse 438 laser trigger 430) and/or collection of data from BB84 receiver 200 (e.g., BB84 receiver output 432) and/or backflash APD 428 (e.g., backflash APD output 434). Pulse generator 402 can also define the overall time window for each data cycle, for example, for each emitted laser pulse 438 and corresponding backflash example, a transistor-transistor logic (TTL) signal, that initiates some component in backflash calibration setup 400. As shown in FIG. 4, pulse generator 402 operates pulsed laser 406 by laser trigger 430, and triggers (e.g., initiates) pulsed laser 406 to produce emitted laser pulse 438. Pulse generator 402 also couples to TCSPC system 404 by duplicate laser trigger 442 and time reference signal 436. In some embodiments, pulse generator 402 can be a commercial unit (e.g., Tektronix® AFG 3102 Dual Channel Arbitrary/Function Generator™, Stanford Research Systems DG535 Pulse Generator™, etc.) operated at a high frequency (e.g., 500 KHz, 1 MHz, etc.) for time reference signal 436, laser trigger 430, and duplicate laser trigger 442. In some embodiments, pulsed laser 406 can be a pulsed laser diode laser (e.g., Opto-Electronics Inc. Model PPL1M™) producing emitted laser pulse 438 at a wavelength of about 100 nm to 1 mm, and preferably 400 nm to 1100 nm, for example, at about 850 nm.

Emitted laser pulse 438 transmits along free-space channel 444 through optical filter 418 to BB84 receiver 200. As described above, BB84 receiver 200 detects emitted laser pulse 438, similar to emitted photon 116, and sends BB84 receiver output 432 to TCSPC system 404. Backflash 440 created by BB84 receiver 200 travels in the opposite direction of emitted laser pulse 438 and is reflected off optical filter 418 and routed to second polarizer 426 and backflash APD 428. In some embodiments, due to the rotated optical filter 418, 99.9% of backflash 440 is reflected off optical filter 418, while the other 0.01% of backflash 440 is transmitted through optical filter 418 and lost. Second polarizer 426 can determine correlations between the polarization of emitted laser pulse 438 and backflash 440. Second polarizer 426 is mounted between optical filter 418 and backflash APD 428. Similar to eavesdropping receiver 106 with second photodetector 114, backflash APD 428 can be a SPAR or multi-channel APD array. For example, similar to second photodetector 114, backflash APD 428 can be a SPAD (e.g., Perkin-Elmer® SPCM-AQR-15-FCT™, etc.). For example, similar to second photodetector 114, backflash APD 428 can be four channel single photon APD array 212 (e.g., Perkin-Elmer® SPCM-AQ4C™, etc.). Backflash APD 428 detects backflash 440 and polarization dependence 124 of backflash 440, similar to backflash 118, and sends backflash APD output 434 to TCSPC system 404 which characterizes polarization dependence 124 of backflash 440.

In some embodiments, second polarizer 426 can be adjustable linear polarizer 446. In some embodiments, second polarizer 426 can include an actuator or a transducer for incrementally rotating second polarizer 426 about its axis in increments of fractions of a degree. For example, adjustable linear polarizer 446 can be mounted within a rotator (e.g., ThorLabs® Model PRM1Z8 Motorized Precision Rotation Mount™, etc.) for computerized control of the angle of adjustable linear polarizer 446 with respect to the horizontal. In some embodiments, as shown in FIG. 4, optical filter 418 can be, for example, a neutral density (ND) optical filter (e.g., 3.0 ND, 30 ND, etc.). In some embodiments, optical filter 418 can be rotated off the beam axis. For example, optical filter 418 can be rotated 20° off the beam axis.

In some embodiments, data acquisition is handled by TCSPC system 404. TCSPC system 404 is coupled to pulse generator 402, BB84 receiver 200, and backflash APD 428, Pulse generator 402 provides time reference signal 436 to synchronize (SYNC) the internal clock of TCSPC system 404. Pulse generator 402 also sends duplicate laser trigger 442 with an advance of, for example, 1 microsecond, relative to laser trigger 430 to provide a signal to SYNC Channel. SYNC Channel synchronizes and initiates data collection by TCSPC system 404, and operates as an electrical timing reference channel to compare with laser trigger 430, emitted laser pulse 438, BB84 receiver output 432, backflash 440, and backflash APD 434 signals. For example, SYNC Channel can permit real-time scanning of an ordered stream of recorded timing events. BB84 receiver output 432 is sent to TCSPC system 404, which corresponds to the output of four channel APD array 212. For example, first APD 214 corresponds to Channel 1, second APD 216 corresponds to Channel 2, third APD 218 corresponds to Channel 3, and fourth APD 220 corresponds to Channel 4. TCSPC system 404 records the start of each laser pulse cycle and the global time of every event in every channel. For example, when APD 214, 216, 218, 220 detects emitted laser pulse 438 or backflash APD 428 detects backflash 440, respective BB84 receiver output 432 or backflash APD output 434 is sent to TCSPC system 404, which time tags the signal as an event in that corresponding channel. In some embodiments, TCSPC system 404 can be a commercial unit (e.g., PicoQuant® HydraHarp 400™, etc.) operated with 1 picosecond resolution, for example.

In some embodiments, backflash calibration setup 400 can include variable attenuator 408. For example, as shown in FIG. 4, variable attenuator 408 can reduce the power (P) of pulsed laser 406 such that emitted laser pulse 438 is a faint pulse, for example, $P \propto 10^{-15}$ W or 1 femtowatt, that approximates a single photon source. In some embodiments, backflash calibration setup 400 can include first collimator 410 and second collimator 412. For example, as shown in FIG. 4, first and second collimators 410, 412 can be disposed at opposite ends of free-space channel 444. In some embodiments, backflash calibration setup 400 can include backflash mirror 422. For example, as shown in FIG. 4, backflash mirror 422 can route backflash 440 from optical filter 418 to second polarizer 426. In some embodiments, backflash calibration setup 400 can include third collimator 424. For example, as shown in FIG. 4, third collimator 424 can route backflash 440 transmitted through second polarizer 426 to backflash APD 428.

In some embodiments, backflash calibration setup 400 can include first polarizer 414 and quarter-wave plate 416. For example, as shown in FIG. 4, first polarizer 414 can be a linear polarizer ($\pi/4$) 448 and quarter-wave plate 416 can be oriented such that emitted laser pulse 438 is circularly polarized before transmitting through optical filter 418 and impinging on BB84 receiver 200. In some embodiments, circular polarization may be necessary for a balanced distribution of all emitted laser pulses 438 since polarized beamsplitters evenly split circularly polarized light. In some embodiments, backflash calibration setup 400 can include beam dump 420. For example, as shown in FIG. 4, beam dump 420 can collect emitted laser pulse 438 reflected off optical filter 418.

Figure 5:
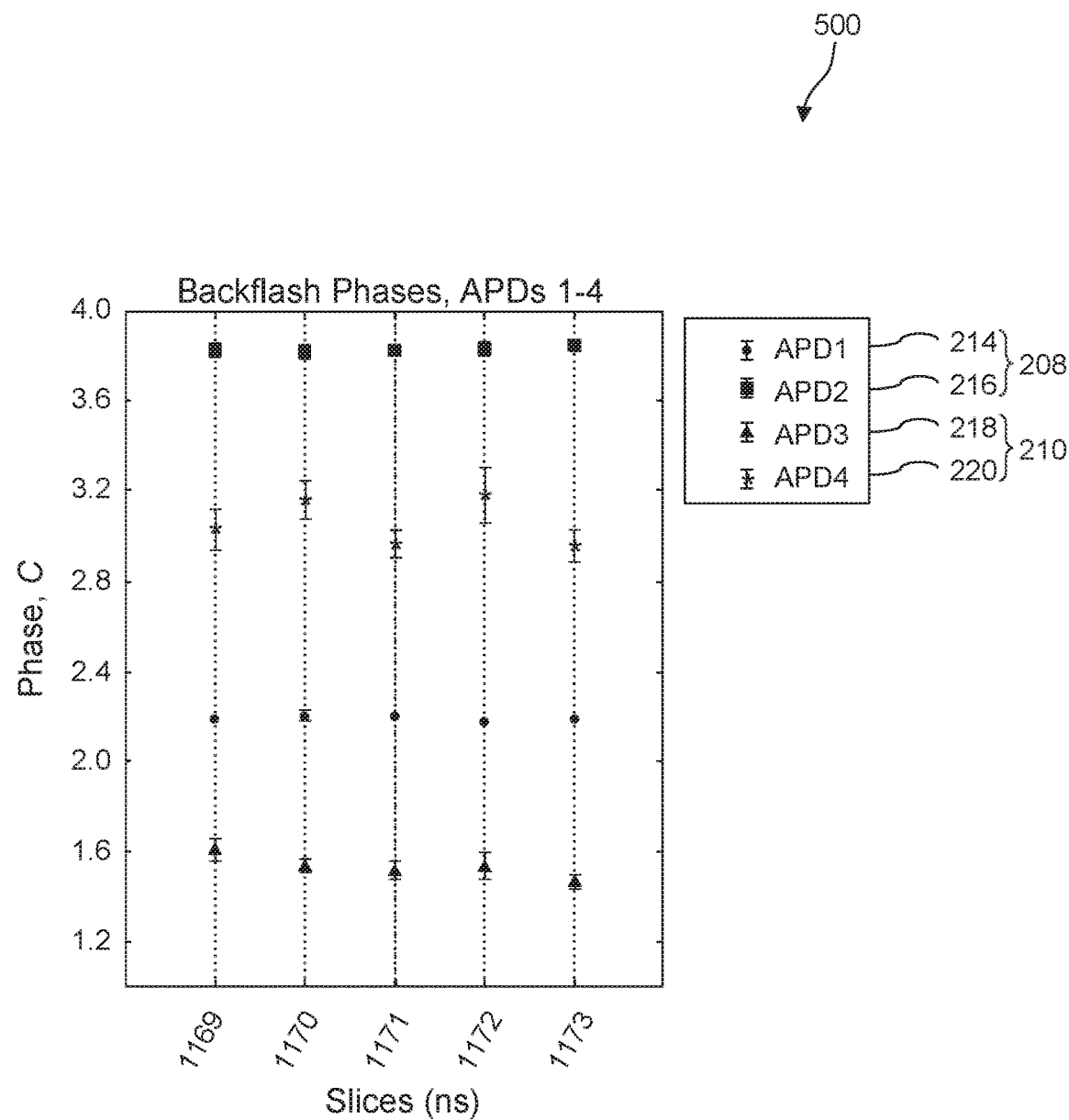
FIG. 5 illustrates a plot of the polarization dependence of backflashes, according to some embodiments.

FIG. 5 illustrates example backflash calibration data 500 plotting polarization dependence 124 of backflash 440, according to an embodiment. Backflash 440 events from individual APDs 214, 216, 218, 220 can be isolated by correlating BB84 receiver output 432 with backflash APD output 434. TCSPC system 404 can analyze output data 432, 434 and plot backflash 440 events as a function of time, counts, and polarization. In some embodiments, second polarizer 426 can be adjustable linear polarizer 446. For example, TCSPC system 404 can plot backflash 440 as a function of rotational angle for adjustable linear polarizer 446. Data for each backflash 440 from each APD 214, 216, 218, 220 can be plotted by TCSPC system 404 to characterize polarization dependence 124 of each backflash 440. As shown in the example of FIG. 4, adjustable linear polarizer 446 was selected for second polarizer 426 for trial measurements and mounted in front of backflash APD 428. In total, thirteen trials were performed with adjustable linear polarizer 446 rotating in 15° increments after each trial from 0° to 180°. Malus's law gives the relationship between the intensity of a light beam passing through a linear polarizer and the angle of the polarizer as:

$$I = I_0 \cos^2(\theta),$$

where I is the measured light intensity, $I_0$ is the incident intensity, and θ is the angle between the direction of polarization of the incident light and the linear polarizer. Individual slices of backflash data can be fit with the following generic function:

$$A \cos^2(Bx+C)+D,$$

where A is the amplitude, $2\pi/B$ is the period, C/B is the phase shift, and D is the vertical shift. One can assume B=1, since only data associated with linear polarizer angles of 0° to 180° provide correlations between backflash events and polarization due to the symmetry of adjustable linear polarizer 446.

As shown in the example of FIG. 5, data can be plotted into consecutive, non-overlapping time intervals (e.g., a slice) by binning or quantizing into small time intervals, for example, a bin-slice of 1 ns. Estimated phase values of five slices (e.g., each bin-slice is 1 ns wide) of detected backflashes 440 show four distinct phases, each corresponding to one of four APDs 214, 216, 218, 220. First APD 214 and second APD 216 correspond to HV basis 208, while third APD 218 and fourth APD 220 correspond to AD basis 210. Since HV basis 208 and AD basis 210 correspond to two orthogonal basis states, a phase difference of $\pi/2$ (~1.57) is shown between first APD 214 and second APD 216 as well as between third APD 218 and fourth APD 220. Similarly, since AD basis 210 is HV basis 208 rotated by $\pi/4$, a phase difference of $\pi/4$ (~0.78) is shown between cross-basis pairs (e.g., between first APD 214 and third APD 218, between second APD 216 and fourth APD 220, etc.). FIG. 5 shows a correlation between polarization dependence 124 of backflash 440 from each APD 214, 216, 218, 220, and the originating basis (either HV basis 208 or AD basis 210) is identifiable based on the phase separation of cross-basis pairs. As shown in FIG. 5, for any slice identified on the X-axis (horizontal time slice axis), the detection from any of APDs 214, 216, 218, 220 will register as a corresponding Phase C.

FIG. 6 illustrates QKD system 600, according to some embodiments. QKD system 600 may include photon emitter 602, photon receiver 604, and quantum channel 620. In QKD system 600, Alice creates randomly polarized photons with photon emitter 602 and sends emitted photon 616 with polarization state 622 along quantum channel 620 to Bob. Bob receives and measures emitted photon 616 with polarization state 622 with photon receiver 604. In some embodiments, quantum channel 620 can be free-space channel 648 and emitted photon 616 can have a wavelength of wavelength of 400 nm to 1100 nm. In some embodiments, quantum channel 620 can be fiber optic channel 650 and emitted photon 616 can have a wavelength of 1100 nm to 1600 nm. In some embodiments, emitted photon 616 with polarization state 622 can be circularly polarized 652.

Photon receiver 604 may include BB84 receiver 200, backflash receiver 606, data acquisition (DAQ) subsystem 634, and first input port 654. As described above, BB84 receiver 200 may include first polarization optic 108, first photodetector 112, and receiver input port 132. Emitted photon 616 with polarization state 622 transmits through receiver input port 132 and first polarization optic 108. First polarization optic 108 is configured to output polarization state 622 of emitted photon 616. For example, first polarization optic 108 can be non-polarizing 50:50 beamsplitter 202. In some embodiments, first polarization optic 108 can be a plurality of first polarization optics including, for example, non-polarizing 50:50 beam splitter 202, half-wave plate ($\pi/8$) 222, first polarizing beamsplitter 224, and/or second polarizing beamsplitter 226, or any combination thereof. First photodetector 112 is configured to detect emitted photon 616 from the output of first polarization optic 108. In some embodiments, first photodetector 112 is four channel single photon APD array 212. For example, four channel single photon APD array 212 is configured to simultaneously detect polarization state 622 of emitted photon 616 from photon emitter 602. As shown in FIG. 6, BB84 receiver 200 generates backflash 618 traveling back out of BB84 receiver 200 in a direction anti-parallel to emitted photon 616, which can be detected by Bob with backflash receiver 606.

Backflash receiver 606 can include second polarization optic 610, second photodetector 614, and backflash optical circulator 632. As shown in FIG. 6, for example, Bob can utilize backflash optical circulator 632 to siphon off and investigate backflash 618 without disturbing polarization state 622 of emitted photon 616 for internal calibration of photon receiver 604. Bob detects backflash 618 with second photodetector 614 and detects polarization dependence 624 of backflash 618 by using second polarization optic 610 to deduce the original polarization state 622 of emitted photon 616. In some embodiments, backflash receiver 606 is configured to detect backflash 618 from BB84 receiver 200 with second polarization optic 610. Second polarization optic 610 is configured to output polarization dependence 624 of backflash 618. In some embodiments, second polarization optic 610 can be a plurality of first polarization optics 108 including, for example, non-polarizing 50:50 beamsplitter 202, half-wave plate ($\pi/8$) 222, first polarizing beamsplitter 224, second polarizing beamsplitter 226, and/or optical circulator 134, or any combination thereof. Second photodetector 614 is configured to detect backflash 618 from the output of second polarization optic 610. In some embodiments, second photodetector 614 can be four channel single photon APD array 212. In some embodiments, backflash optical circulator 632 can be an optical isolator, an optical modulator, an optical filter, or some combination thereof. Similar to BB84 receiver 200, in some embodiments, backflash receiver 606 can mimic the same optical arrangement and scheme as BB84 receiver 200.

DAQ subsystem 634 may be coupled to BB84 receiver 200 and backflash receiver 606, and may characterize polarization dependence 624 of backflash 618. DAQ subsystem 634 measures first photodetector output 628 from first photodetector 112 of BB84 receiver 200 and second photodetector output 630 from second photodetector 614 of backflash receiver 606. DAQ subsystem 634 detects and measures signals received by BB84 receiver 200 and backflash receiver 606. For example, DAQ subsystem 634 can detect and measure emitted photon 616 received by BB84 receiver 200, and determine polarization state 622 and basis (either HV basis 208 or AD basis 210) of emitted photon 616 by measuring which APD 214, 216, 218, 220 a signal or time stamp of emitted photon 616 during a finite time window is detected. Similarly, for example, DAQ subsystem 634 can detect and measure backflash 618 generated by BB84 receiver 200 and collected by second photodetector 614, and determine polarization dependence 624 of backflash 618 by configuring second polarization optic 610. For example, second polarization optic 610 can be configured to mimic that of first polarization optic 108 of BB84 receiver 200 and second photodetector 614, similar to four channel single photon APD array 212, can measure which APD 214, 216, 218, 220 a signal or time stamp of backflash 618 during a finite time window is detected.

In some embodiments, DAQ subsystem 634 can include pulse generator 402, TCSPC system 404, signal conditioning circuitry 656, analog-to-digital converters (ADC) 658, processor 660, memory 662, and/or central processing unit (CPU) 664, or some combination thereof. In some embodiments, DAQ subsystem 634 is configured to decrypt the QKD or secret key transmitted between photon emitter 602 and photon receiver 604 by Alice to Bob. For example, backflash receiver 606 can determine polarization state 622 and basis (either HV basis 208 or AD basis 210) of emitted photon 616 by measuring backflash 618 generated by BB84 receiver 200 and collected by second photodetector 614, and determine polarization dependence 624 of backflash 618 by configuring second polarization optic 610 to mimic that of first polarization optic 108 of BB84 receiver 200.

In some embodiments, DAQ subsystem 634 is configured to calibrate QKD system 600 based on polarization dependence 624 of backflash 618. For example, DAQ subsystem 634 can calibrate an information leakage percentage of QKD system 600 based on detected correlations between measured polarization state 122 of emitted photon 616 by BB84 receiver 200 and corresponding backflash 618 by backflash receiver 606. In some embodiments, DAQ subsystem 634 or QKD system 600 is configured to calibrate an external QKD system or quantum cryptography system. For example, the external QKD system can be calibrated by measuring polarization dependence 624 of backflash 618 and determining an information leakage percentage of the external QKD system based on detected correlations, for example, number of corresponding registered bits (either 0 or 1) between measured polarization state 122 of emitted photon 616 by BB84 receiver 200 and corresponding backflash 618 by backflash receiver 606. For example, an external QKD system or quantum cryptography system can be a commercial system (e.g., ID Quantique (SwissQuantum), MagiQ Technologies, Inc. (Navajo), QuintessenceLabs (qCrypt), SeQureNet (Cygnus), etc.) or a QKD network (e.g., DARPA, SECOQC, Tokyo QKD, Los Alamos, etc.).

In some embodiments, QKD system 600 can include alarm subsystem 636. In some embodiments, as shown in FIG. 6, alarm subsystem 636 can be coupled to DAQ subsystem 634, and trigger alarm signal 666 or alarm indicator 668 if an information leakage percentage or quantum bit error rate (QBER) measured by DAQ subsystem 634 exceeds a predetermined value. For example, QBER can be determined by measuring the amount of destroyed states of emitted photon 616. QBER is the ratio of an error rate to a QKD rate. QBER indicates the amount (e.g., percentage) of information Eve knows and is a measure of the secrecy between Alice and Bob represented by the fraction Alice's and Bob's states differ (e.g., differences between corresponding registered bits 0 or 1 for the same polarization basis). Since any interaction by Eve to the quantum states would destroy the states by perturbing the correlations (e.g., polarization) between them, QBER increases as Eve interacts with Alice's qubits and is a simple way to check for eavesdropping. However, QBER is unaffected by backflashes, but an information leakage percentage can be measured. For example, the information leakage percentage can be determined by a backflash time correlation with DAQ subsystem 634 and BB84 receiver 200. Specifically, for example, the information leakage percentage can be based on detected correlations of polarization dependence 624 of backflash 618 with DAQ subsystem 634, for example, number of corresponding registered bits (either 0 or 1) between measured polarization state 122 of emitted photon 616 by BB84 receiver 200 and corresponding backflash 618 by backflash receiver 606. In some embodiments, alarm indicator 668 can be visual (e.g., light, LED, etc.), audial (e.g., siren, buzzer, etc.), or vibrational. In some embodiments, as shown in FIG. 6, alarm signal 666 is coupled to and can trigger deterring subsequent measurement mechanism 638.

In some embodiments. QKD system 600 can include deterring subsequent measurement mechanism 638. For example, as shown in FIG. 6, deterring subsequent measurement mechanism 638 can include optical isolator 640, optical circulator 642, optical modulator 644, optical filter 646, optical switch 670, and/or optical router 672, or some combination thereof. In some embodiments, backflash optical circulator 632 is optical circulator 642 contained in BB84 receiver 200 and coupled to alarm signal 666 of alarm subsystem 636. For example, alarm signal 666 can be triggered if QBER or information leakage percentage exceeds a predetermined threshold value. In some embodiments, optical filter 646 can be utilized to reduce the majority of backflashes 618. For example, optical filter 646 can be a narrow-band filter with a spectral width of about 1 nm full width at half maximum (FWHM) centered at around emitted photon 616 wavelength, for example, a wavelength of 850 nm. In some embodiments, optical switch 670 can be an active 2×2 optical switch. In some embodiments, deterring subsequent measurement mechanism 638 can include a time delay. For example, optical switch 670 or optical router 672 can include a time delay that occurs after a SYNC signal or time reference signal from photon emitter 602 is received by DAQ subsystem 634 to switch off or route backflash 618 generated after emitted photon 616 impinges first photodetector 112.

In some embodiments, backflash receiver 606 can be omitted from QKD system 600. In some embodiments, backflash optical circulator 632 can be omitted from QKD system 600. In some embodiments, backflash optical circulator 632 can be dynamically controlled by DAQ subsystem 634 or alarm subsystem 636. For example, alarm signal 666 can be coupled to backflash optical circulator 632 and trigger activation of backflash optical circulator 632 to siphon off backflash 618.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A quantum cryptography apparatus, comprising:
a photon emitter configured to emit a photon at a wavelength;
a photon receiver coupled to the photon emitter by at least one quantum channel and comprising a first polarization optic configured to output the emitted photon in a polarization state;
a first photodetector configured to detect the emitted photon from the output of the first polarization optic;
a second photodetector configured to detect a backflash from the first photodetector; and
a second polarization optic between the first photodetector and the second photodetector,
wherein the second photodetector and the second polarization optic are configured to internally calibrate the photon receiver.

2. The apparatus of claim 1, wherein the photon receiver is internally calibrated based on an information leakage percentage of the quantum cryptography apparatus.

3. The apparatus of claim 1, wherein the second polarization optic is configured to detect a polarization dependence of the backflash from the first photodetector.

4. The apparatus of claim 1, wherein the second photodetector is a four channel single photon counting avalanche photodiode (APD) array configured to simultaneously detect the polarization dependence of the backflash from the first photodetector.

5. The apparatus of claim 1, wherein:
the at least one quantum channel is a free space channel; and
the wavelength of the emitted photon is 400 nm to 1100 nm.

6. The apparatus of claim 1, wherein:
the at least one quantum channel is a fiber optic channel; and
the wavelength of the emitted photon is 1100 nm to 1600 nm.

7. The apparatus of claim 1, wherein the second polarization optic comprises an adjustable linear polarizer.

8. A quantum key distribution system, comprising:
a photon emitter configured to emit a photon at a wavelength;
a photon receiver coupled to the photon emitter by at least one quantum channel and comprising a first polarization optic configured to output the emitted photon in a polarization state;
a first photodetector configured to detect the photon emitted from the output of the first polarization optic;
a second photodetector configured to detect a backflash from the first photodetector;
a second polarization optic between the first photodetector and the second photodetector,
wherein the second photodetector and the second polarization optic are configured to internally calibrate the photon receiver.

9. The system of claim 8, wherein the second polarization optic is configured to detect a polarization dependence of the backflash from the first photodetector.

10. The system of claim 8, wherein:
the at least one quantum channel is a free space channel; and
the wavelength of the emitted photon is 400 nm to 1100 nm.

11. The system of claim 8, wherein:
the at least one quantum channel is a fiber optic channel; and
the wavelength of the emitted photon is 1100 nm to 1600 nm.

12. The system of claim 8, wherein the second photodetector is a four channel single photon counting avalanche photodiode (APD) array configured to simultaneously detect the polarization dependence of the backflash from the first photodetector.

13. The system of claim 8, wherein the photon receiver is internally calibrated based on an information leakage percentage of the quantum key distribution system.

14. The system of claim 13, wherein the information leakage percentage is based on a number of corresponding registered bits between the polarization state of the emitted photon and a polarization dependence of the backflash.

15. The system of claim 8, further comprising a data acquisition system coupled to the second photodetector, wherein the data acquisition system characterizes a polarization dependence of the backflash and deduces the polarization state of the emitted photon.

16. The system of claim 15, wherein:
the photon receiver comprises a backflash receiver comprising an optical circulator, the second photodetector, and the second polarization optic; and
the backflash receiver and the data acquisition system are configured to internally calibrate the photon receiver.

17. The system of claim 15, wherein the data acquisition system comprises an alarm configured to trigger a signal and/or an indicator.

18. The system of claim 17, wherein the alarm is based on an information leakage percentage and/or a quantum bit error rate of the quantum key distribution system.

19. The system of claim 15, wherein the data acquisition system is configured to decrypt a quantum key distribution between the photon emitter and the photon receiver.

20. The system of claim 15, wherein the data acquisition system comprises a pulse generator, a time-correlated single photon counting system, a signal conditioning circuit, an analog-to-digital converter, a processor, a memory, a central processing unit, or some combination thereof.

* * * * *